Nov. 19, 1946. J. H. BUECHLER 2,411,245
NUT TIGHTENER
Filed Nov. 13, 1944
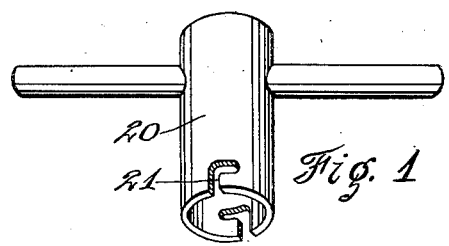
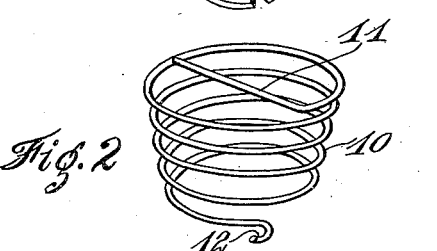
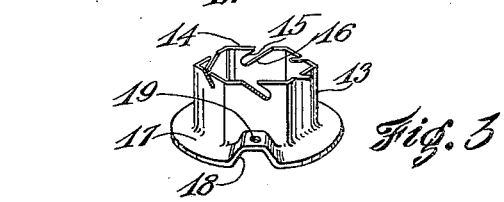
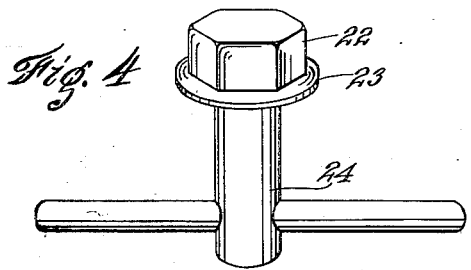
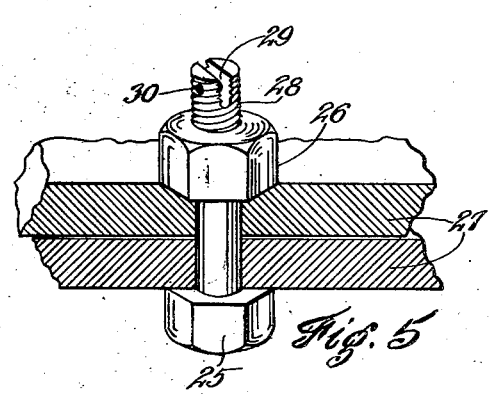
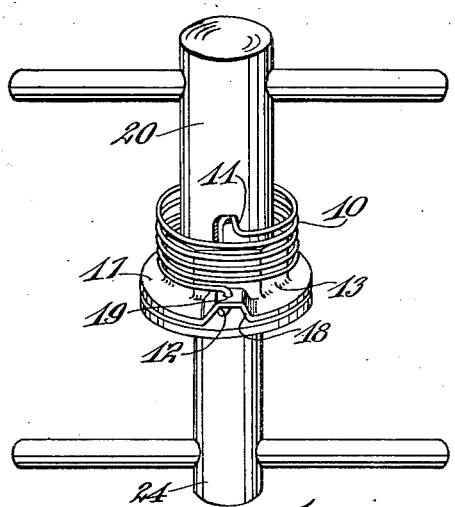
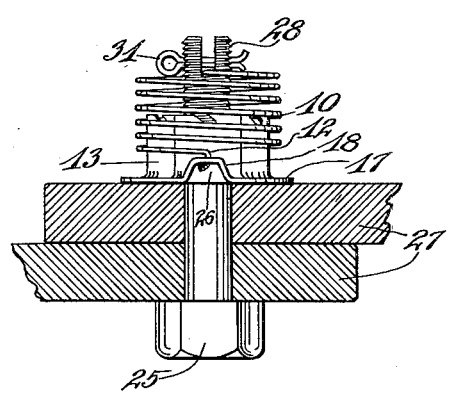
J. H. Buechler
INVENTOR.
BY Milo B. Stevens & Co.
Attorneys Patented Nov. 19, 1946

2,411,245

UNITED STATES PATENT OFFICE 2,411,245

NUT TIGHTENER

John Henry Buechler, Chicago, Ill.

Application November 13, 1944, Serial No. 563,164

6 Claims. (Cl. 85—32)

My invention relates to nut locks, and more particularly to devices which are designed to act automatically to tighten or screw down a nut which may become loosened from vibration, and one object is to provide a device of this kind which requires no alteration of the nut.

A further object is to provide a nut tightener which employs a form or accessory sleeve as its base and for the purpose of imparting the tightening movement to the nut.

Another object is to provide a device of the above character which uses the projecting end of the screw or bolt on which the nut is mounted as an anchor to maintain a torsional influence on the nut.

A still further object is to secure the anchor referred to above by means of a slot in the end of the screw or bolt where such end is superfluous and therefore suffers no weakening influence from the presence of the slot.

An additional object is to provide a nut tightener which can be kept in stock as a unit for instant application to the nut when required.

An important object of the invention is to constitute the novel tightener in a manner to be pre-wound by means at the factory or plant where it is manufactured and applied to the nut by a simple tool in a manner to transfer its influence to the same.

An essential object of the invention is to construct the same of only two parts, and in a form to be produced at small expense.

With the above objects in view and any others which may suggest themselves from the description to follow, a better understanding of the invention may be had by reference to the accompanying drawing, in which—

Fig. 1 is a perspective view of a tool employed to wind the nut tightener;

Fig. 2 is a perspective view of a spring forming one component of the tightener;

Fig. 3 is a similar view of a shell forming the other component thereof;

Fig. 4 is another view showing a die employed for winding of the tightener;

Fig. 5 is a perspective view of a bolt and nut assembly in readiness for the application of the tightener;

Fig. 6 is a perspective view showing the manner in which the container is wound and set; and Fig. 7 is an elevation of the bolt and nut assembly with the tightener mounted thereon.

In accordance with the foregoing, specific reference to the drawing indicates the first-mentioned component of the tightener as a coil spring 10. It is noted that the spring is flared upwardly, has its upper end portion 11 bent in as a cross bar and its lower end portion 12 formed as a hook.

The second component of the nut tightener is in the form of a sleeve 13 of hexagonal design to be suitable to slide over a nut of the same form and approximate size. It is understood that the sleeve may be made square or of any other design to conform to the type of nut it is intended to serve. The top edge 14 of the sleeve is formed with a series of oblique and diametrically paired notches or pockets 15, the floors of these rising with inclines 16 to the original level of the said top edge. The sleeve also has an outward base flange 17, one portion of which is raised in the form of a hump 18 containing a perforation 19 in its crown. The sleeve is of light sheet metal, and may be made in the form of a stamping.

The coil spring 10 and the sleeve 13 are intended to be joined as a unit which may be kept or stocked in readiness for application to a nut whenever desired. In its normal or original form the spring is taller than the sleeve; and the bottom of the spring is of a diameter to fit smoothly around the body of the sleeve when the spring is mounted thereon. When this is done, the hook 12 of the spring is caught in the perforation of the sleeve hump 18, as indicated in Fig. 6.

The joining of the spring 10 with the sleeve 13 also involves the tensioning of the spring in relation to the sleeve. This is done by winding the spring from the top, and involves the rotation of the spring cross bar 11 in a clockwise direction in accordance with Fig. 2. The winding may be done by means of a key-wrench 20 formed with bayonet slots 21 at the bottom, these serving to retain the cross bar 11 against dropping out of the wrench after the latter has been lowered on the cross bar and given a partial turn. If the winding influence on the sleeve is too strong for the same to be held by hand, the sleeve may first be mounted on a hexagonal die 22 having a flanged base 23 and forming part of an inverted key-wrench 24. The spring may now be wound to a desired tension and to a point where the cross bar 11 spans an opposed pair of the sleeve notches 15. The cross bar has sufficient length for this purpose by extending fully across the top spring coil. Downward pressure on the wrench 20 will seat the cross bar in the notches 15, and a backward turn and lift of the wrench will cause it to release the spring. The latter is now wrapped in tensioned relation to the sleeve. It will now be appreciated that the original height and flare of the spring were necessary because the spring not only shortens when its convolutions get closer from winding, but the coils also have a contracting tendency from the winding end, so that the flares provides sufficient room between the spring and the body of the sleeve to allow for the contraction of the spring as it is wound.

When the unit formed by the spring and the sleeve has been wound by its accessory wrenches, the assembly appears as in Fig. 6. However, when the unit is in production the hand-wrench winding method—treated and illustrated merely as an example or shop expedient—will be replaced by suitable machine methods, particularly where the springs are of heavier gage or the required tension stronger.

The application of a nut tightener unit of the above character to the work requires no change in the nut, and only a slight change in the bolt. Thus, an assembly of a bolt 25 with a nut 26 tightened on a pair of plates 27 is shown in Fig. 5. The threaded bolt shank 28 rising above the nut is diametrically slotted for the present purpose, as indicated at 29, the width of the slot being preferably two-thirds the diameter of the bolt shank 28. In application, the tensioned unit of the spring 10 and sleeve 13 is mounted to seat the sleeve base flange 17 on the upper plate 27 and the sleeve body around and in fitting relation with the nut. The key-wrench 20 is now applied to the spring cross bar 11 with a winding influence to raise it out of the notches 15 and off the sleeve. Now the wrench is either held or turned to locate the cross bar over the slot 29, depressed to seat the cross bar deeply in the slot, and removed. The tension of the spring now holds its cross bar firmly in the slot, and the sleeve exerts pressure on the nut in the tightening direction. Thus, should the nut loosen somewhat from vibration or the settling of the parts secured by the bolt, the sleeve will instantly tighten the nut and hold such parts secure.

While it may rarely occur, it is possible that over a long period of use the nut tightener may take up looseness so far as to cause the spring to lose most or all of its tension. In such event, and particularly when the bolt extends at an angle or in a horizontal position, the tightener could slide or fall off from vibration or impact by some object. Figs. 5 and 7 show a simple expedient against such an eventuality. Thus, the bolt shank may be made with a cross-bore 30 near its free end, and a cotter pin 31 applied after the nut tightener has been fitted. In this case the latter can at no time slide or be knocked off or become lost.

It has been mentioned that the width of the slot is as much as two-thirds of the bolt shank diameter. This allows a wider latitude in the location of the slot by the cross bar 11 when the tightener is fitted to the nut, so that the slot is found quite readily as the key-wrench is turned. It is also possible to apply the tightener without the use of the key-wrench. Thus, when the tightener is positioned with the cross bar 11 in alinement with the slot 29 and mounted on the nut with pressure, the cross bar will be raised out of the tightener by the bottom of the slot. The extra width of the latter does not weaken the bolt, since the slot is made in a portion well beyond the useful or required length of the bolt; and such portion will of course have more strength than necessary to resist the tension of the spring.

It will be evident from the above description that I have provided a nut tightener which can be kept or stocked as a unit or accessory in the wound or "set condition for use as needed. In such event a simple key-wrench or like implement suffices to fit the tightener to the work. It can then remain in place indefinitely, takes up little more room than the nut and will not get out of order or adjustment, acting automatically to take up nut looseness in the event of vibration, settling or shrinkage of the work or material secured. Also, the cotter-pin expedient is applicable to insure against the loss of the tightener in any event. Further, the device consists of only two parts made of commonly available materials and capable of being fabricated and assembled by machine methods, so that the tightener may be produced at low cost, to sell in an assortment of sizes and along with a line of slotted bolts and accessory key-wrenches to manufacturers and users of machinery, engines and the like.

While I have described the invention along specific lines, various minor changes or refinements may be made therein without departing from its principles, and I desire to consider such changes and refinements as coming within the scope and spirit of the appended claims.

I claim:

1. A pre-set tightener for a nut securing work on a bolt, wherein the free end of the latter projects from the nut and is formed with an end slot, comprising a member adapted to be mounted non-rotatably on the nut, and a wound coil spring surrounding the member, the ends of the spring being attached to the member, one end of the spring being movable from the member and adapted to be secured to the bolt by being deposited in said slot, and the winding of the spring being in a direction to influence the member to turn the nut in the tightening direction.

2. The structure of claim 1, said member being a sleeve with notch means in one end, and said one end of the spring being deposited in said notch means.

3. The structure of claim 1, said member being a sleeve with a pair of undercut notches on diametrically-opposite sides in one end, and said one end of the spring being a cross bar deposited in said pair of notches and locked in said notches by the tension of the spring.

4. The structure of claim 1, said member being a sleeve with a pair of undercut notches on diametrically-opposite sides in one end, and said one end of the spring being a cross bar deposited in said pair of notches and locked in said notches by the tension of the spring, the floors of the notches extending inclinedly to said end of the sleeve.

5. The structure of claim 1, the spring being flared in the direction of said end prior to being wound.

6. The structure of claim 1, said member being a sleeve around the nut, and the spring being taller than the sleeve prior to being wound.

JOHN HENRY BUECHLER.